United States Patent
Ogi et al.

(10) Patent No.: US 12,100,838 B2
(45) Date of Patent: Sep. 24, 2024

(54) ENERGY STORAGE DEVICE AND METHOD FOR MANUFACTURING ENERGY STORAGE DEVICE

(71) Applicant: GS Yuasa International Ltd., Kyoto (JP)

(72) Inventors: Kenta Ogi, Kyoto (JP); Fumiya Nakano, Kyoto (JP); Ryosuke Shimokawa, Kyoto (JP); Shota Ito, Kyoto (JP); Masaki Masuda, Kyoto (JP); Taro Yamafuku, Kyoto (JP); Kei Kumabayashi, Kyoto (JP); Akihiko Miyazaki, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 690 days.

(21) Appl. No.: 17/274,668

(22) PCT Filed: Sep. 10, 2019

(86) PCT No.: PCT/JP2019/035525
§ 371 (c)(1),
(2) Date: Mar. 9, 2021

(87) PCT Pub. No.: WO2020/054708
PCT Pub. Date: Mar. 19, 2020

(65) Prior Publication Data
US 2021/0257618 A1    Aug. 19, 2021

(30) Foreign Application Priority Data

Sep. 11, 2018 (JP) ................................. 2018-170095

(51) Int. Cl.
| | | |
|---|---|---|
| *H01M 4/587* | (2010.01) | |
| *H01G 11/32* | (2013.01) | |
| *H01G 11/78* | (2013.01) | |
| *H01G 11/86* | (2013.01) | |
| *H01M 4/02* | (2006.01) | |
| *H01M 4/133* | (2010.01) | |
| *H01M 4/1393* | (2010.01) | |
| *H01M 50/574* | (2021.01) | |
| *H01M 50/578* | (2021.01) | |

(52) U.S. Cl.
CPC ............ *H01M 4/587* (2013.01); *H01G 11/32* (2013.01); *H01G 11/78* (2013.01); *H01G 11/86* (2013.01); *H01M 4/133* (2013.01); *H01M 4/1393* (2013.01); *H01M 50/574* (2021.01); *H01M 50/578* (2021.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 2005/0014067 A1 | 1/2005 | Tenno et al. |
| 2007/0275302 A1 | 11/2007 | Sotowa et al. |
| 2009/0130561 A1 | 5/2009 | Matsumoto et al. |
| 2011/0193014 A1 | 8/2011 | Sotowa et al. |
| 2013/0071733 A1* | 3/2013 | Abe ............... H01M 10/0566 429/188 |
| 2013/0196189 A1 | 8/2013 | Minami et al. |
| 2015/0162640 A1* | 6/2015 | Waseda ............ H01M 10/0525 29/623.5 |
| 2015/0221927 A1* | 8/2015 | Lee .................. H01M 50/147 429/163 |
| 2016/0049685 A1 | 2/2016 | Sasaki et al. |
| 2016/0226100 A1 | 8/2016 | Yamada et al. |
| 2017/0110729 A1 | 4/2017 | Tsuchiya et al. |
| 2017/0110730 A1 | 4/2017 | Tanaka |
| 2017/0179487 A1 | 6/2017 | Takeda et al. |
| 2017/0214037 A1 | 7/2017 | Uematsu et al. |
| 2019/0058192 A1 | 2/2019 | Tsuchiya et al. |
| 2019/0237728 A1 | 8/2019 | Wakimoto et al. |
| 2019/0386336 A1* | 12/2019 | Sekimoto ............. H01M 4/137 |
| 2021/0013474 A1 | 1/2021 | Wakimoto et al. |
| 2022/0407069 A1* | 12/2022 | Ogi .................... H01M 4/133 |

FOREIGN PATENT DOCUMENTS

| | | |
|---|---|---|
| EP | 3128586 A1 | 2/2017 |
| JP | 2001-135356 A | 5/2001 |
| JP | 2005-50807 A | 2/2005 |
| JP | 2005-222933 A | 8/2005 |
| JP | 2009-32575 A | 2/2009 |
| JP | 2009-158356 A | 7/2009 |
| JP | 2014-67636 A | 4/2014 |
| JP | 2014-165156 A | 9/2014 |
| JP | 2015-53291 A | 3/2015 |
| JP | 2016-6790 A | 1/2016 |
| JP | 2016-42433 A | 3/2016 |
| JP | 2017-33773 A | 2/2017 |
| JP | 2017-188473 A | 10/2017 |

(Continued)

OTHER PUBLICATIONS

International Search Report (ISR) dated Dec. 3, 2019 filed in PCT/JP2019/035525.

*Primary Examiner* — Anca Eoff
(74) *Attorney, Agent, or Firm* — RANKIN, HILL & CLARK LLP

(57) ABSTRACT

An aspect of the present invention is an energy storage device including an electrode assembly that has a negative electrode and a positive electrode, where the negative electrode contains a negative electrode substrate and a negative active material, and has a negative active material layer disposed in an unpressed shape along at least one surface of the negative electrode substrate, the negative active material includes solid graphite particles as a main component, and the solid graphite particles have an aspect ratio of 1 or more and 5 or less.

10 Claims, 3 Drawing Sheets

(56) References Cited

FOREIGN PATENT DOCUMENTS

| | | |
|---|---|---|
| JP | 2018-22656 A | 2/2018 |
| JP | 2018032477 | 3/2018 |
| JP | 2018-88403 A | 6/2018 |
| WO | 2012-146676 A | 8/2012 |
| WO | 2013/125030 A1 | 8/2013 |
| WO | 2014/133070 A1 | 9/2014 |
| WO | 2015/152114 A1 | 10/2015 |
| WO | 2016/052648 A1 | 4/2016 |
| WO | 2018/003761 A1 | 1/2018 |
| WO | WO2018/168661 * | 9/2019 |

* cited by examiner

ENERGY STORAGE DEVICE AND METHOD FOR MANUFACTURING ENERGY STORAGE DEVICE

CROSS-REFERENCE TO RELATED APPLICATIONS

This application is a National Phase Application of International Application No. PCT/JP2019/035525, filed Sep. 10, 2019, which claims the priority of Japan Patent Application No. 2018-170095, filed Sep. 11, 2018. The present application claims priority from both applications and each of these applications is herein incorporated in their entirety by reference.

TECHNICAL FIELD

The present invention relates to an energy storage device and a method for manufacturing the energy storage device.

BACKGROUND ART

Nonaqueous electrolyte secondary batteries typified by lithium-ion nonaqueous electrolyte secondary batteries are, because of the high energy density, heavily used in electronic devices such as personal computers and communication terminals, and automobiles. The nonaqueous electrolyte secondary batteries each typically include an electrode assembly that has a pair of electrodes electrically isolated by a separator and a nonaqueous electrolyte interposed between the electrodes, and the batteries are configured to be charged and discharged by ion transfer between the both electrodes. In addition, capacitors such as lithium ion capacitors and electric double layer capacitors have been widely used as energy storage devices besides nonaqueous electrolyte secondary batteries.

For the purpose such as increasing the energy density of such an energy storage device and improving the charge discharge efficiency thereof, carbon materials such as graphite are used as a negative active material for the energy storage device (see Patent Document 1).

PRIOR ART DOCUMENT

Patent Document

Patent Document 1: JP-A-2005-222933

SUMMARY OF THE INVENTION

Problems to be Solved by the Invention

However, graphite expands and contracts significantly during charge-discharge. For that reason, with the expansion of the electrode due to charge discharge, the electrode itself or the separator stacked adjacent to the electrode may be possibly loaded, thereby degrading the performance of the energy storage device.

The present invention has been made based on the foregoing circumstances, and an object of the invention is to provide an energy storage device that has an enhanced suppressive effect on the expansion of a negative electrode during initial charge in the case where graphite is used for a negative active material, and a method for manufacturing the energy storage device.

Means for Solving the Problems

An aspect of the present invention for solving the problem mentioned above is an energy storage device including an electrode assembly that has a negative electrode and a positive electrode, where the negative electrode contains a negative electrode substrate and a negative active material, and has a negative active material layer disposed in an unpressed shape along at least one surface of the negative electrode substrate, the negative active material includes solid graphite particles as a main component, and the solid graphite particles have an aspect ratio of 1 or more and 5 or less.

Another aspect of the present invention is an energy storage device including an electrode assembly that has a negative electrode and a positive electrode, where the negative electrode has a negative electrode substrate, and a negative active material layer containing a negative active material and disposed along at least one surface of the negative electrode substrate, the negative active material includes solid graphite particles as a main component, the solid graphite particles have an aspect ratio of 1 or more and 5 or less, and the negative active material layer has a density of 1.20 g/cm$^3$ or more and 1.55 g/cm$^3$ or less.

An aspect of the present invention is an energy storage device including an electrode assembly that has a negative electrode and a positive electrode, where the negative electrode has a negative electrode substrate, and a negative active material layer containing a negative active material and disposed along at least one surface of the negative electrode substrate, the negative active material includes solid graphite particles as a main component, the solid graphite particles have an aspect ratio of 1 or more and 5 or less, and R2/R1 that is the ratio of the surface roughness R2 of the negative electrode substrate in the region without the negative active material layer disposed to the surface roughness R1 of the negative electrode substrate in the region with the negative active material layer disposed is 0.90 or more.

Another aspect of the present invention is a method for manufacturing an energy storage device, including: preparing a negative electrode where a negative active material layer containing a negative active material is disposed along at least one surface of a negative electrode substrate; preparing a positive electrode where a positive active material layer containing a positive active material is disposed along at least one surface of a positive electrode substrate; and stacking the negative electrode and the positive electrode, where the negative active material includes solid graphite particles, the solid graphite particles have an aspect ratio of 1 or more and 5 or less, and the negative electrode is not subjected to pressing the negative active material layer before stacking the negative electrode and the positive electrode.

Advantages of the Invention

According to the present invention, it is possible to provide an energy storage device that has an enhanced suppressive effect on the expansion of a negative electrode during initial charge in the case where graphite is used for a negative active material, and a method for manufacturing the energy storage device.

MODE FOR CARRYING OUT THE INVENTION

Figure 1:
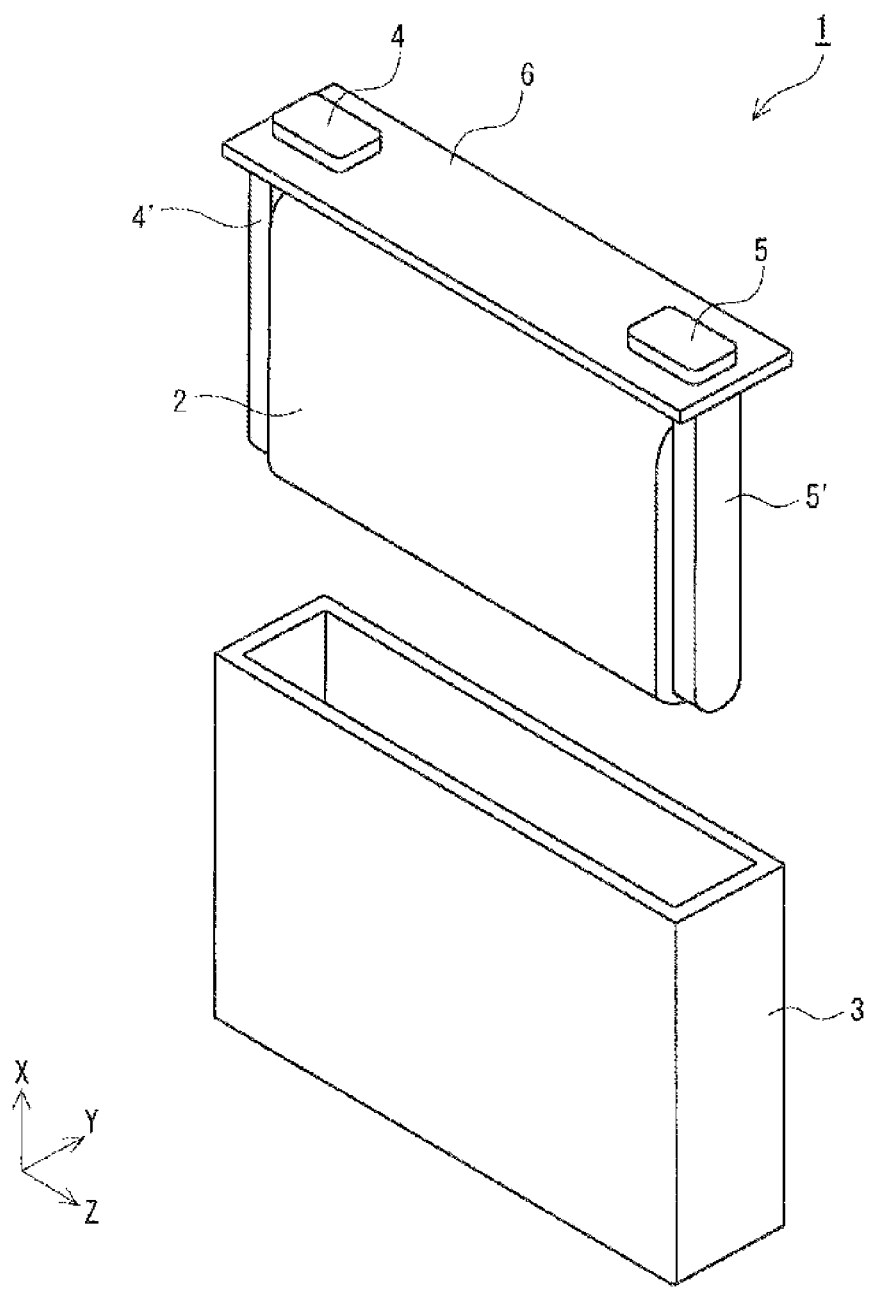
FIG. 1 is a schematic exploded perspective view illustrating an energy storage device according to an embodiment of the present invention.

An aspect of the present embodiment is an energy storage device including an electrode assembly that has a negative electrode and a positive electrode, where the negative electrode contains a negative electrode substrate and a negative active material, and has a negative active material layer disposed in an unpressed shape along at least one surface of the negative electrode substrate, the negative active material includes solid graphite particles as a main component, and the solid graphite particles have an aspect ratio of 1 or more and 5 or less.

The energy storage device has, in the case where graphite is used for the negative active material, an enhanced suppressive effect on the expansion of the negative electrode during initial charge. The reason therefor is not clear, but can be considered as follows.

The energy storage device including the negative electrode where the negative active material layer containing the solid graphite particles as a main component is disposed in an unpressed shape, is configured such that almost no stress is applied to the negative active material until the electrode assembly is formed. Thus, the graphite particles themselves have low residual stress, and the non-uniform expansion of the negative electrode due to the release of the residual stress can be suppressed. In addition, the density in the graphite particles is uniform since the graphite particles are solid, and the graphite particles are close to spherical with the aspect ratio of 1 or more and 5 or less, thus making electric current unlikely to be concentrated, and then making it possible to suppress the non-uniform expansion of the negative electrode. In addition, since the graphite particles are close to spherical as described above, the low orientation of the graphite particles disposed in the active material layer makes the particles likely to be orientated at random, thus making it possible to suppress the non-uniform expansion of the negative electrode. Furthermore, the graphite particles are close to spherical, thereby making the adjacent graphite particles less likely to be caught by each other, making the graphite particles appropriately slipping on each other, and making the graphite particles likely to be maintained in a condition close to the closest packing even if the particles are expanded. As described above, according to the present embodiment, even if the graphite particles are expanded, the particles are presumed to expand in a relatively uniform manner and slide on each other in an appropriate manner, thereby maintaining the negative active material layer in which the graphite particles have a high packing ratio, and thus making it possible to suppress the expansion of the negative electrode during initial charge.

It is to be noted that the term "unpressed" means performing no step of applying a pressure (linear pressure) of 10 kgf/mm or more (for example, 5 kgf/mm or more) to the negative active material layer with an apparatus intended to apply pressure to a workpiece, such as a roll press during the manufacture. More specifically, the term "unpressed" also encompasses applying a slight pressure to the negative active material layer in another step such as winding the negative electrode. In addition, the term "unpressed" encompasses performing a step of applying a pressure (linear pressure) of less than 10 kgf/mm (for example, less than 5 kgf/mm). The term "solid" means that the inside of the particle is filled substantially without voids. More specifically, in this specification, the solid refers to the fact that the area ratio excluding voids in a particle to the area of the entire particle is 95% or more (for example, 96% or more, typically 98% or more) in the cross section of the particle observed in an SEM image obtained with the use of a scanning electron microscope (SEM). The term "main component" means a component that has the highest content, and refers to for example, a component contained in an amount of 50% by mass or more with respect to the total mass of the negative active material. The term "aspect ratio" means a value A/B that refers to the ratio of the longest diameter A of a particle to the longest diameter B in a direction perpendicular to the diameter A, in the cross section of the particle observed in an SEM image obtained with the use of a scanning electron microscope.

An aspect of the present embodiment is an energy storage device including an electrode assembly that has a negative electrode and a positive electrode, where the negative electrode has a negative electrode substrate, and a negative active material layer containing a negative active material and disposed along at least one surface of the negative electrode substrate, the negative active material includes solid graphite particles as a main component, the solid graphite particles have an aspect ratio of 1 or more and 5 or less, and the negative active material layer has a density of 1.20 g/cm$^3$ or more and 1.55 g/cm$^3$ or less.

The negative active material layer increases in density as more pressure is applied to the negative active material layer with a roll press or the like. In other words, in the case where the negative active material layer is low in density, the pressure applied to the negative active material layer is low. In the energy storage device, the density of the negative active material layer including solid graphite particles as a main component is 1.20 g/cm$^3$ or more and 1.55 g/cm$^3$ or less, without the pressure applied to the negative active material layer or with a low pressure applied thereto. Thus, the graphite particles themselves have low residual stress, and the non-uniform expansion of the negative electrode due to the release of the residual stress can be suppressed. In addition, the density in the graphite particles is uniform since the graphite particles are solid, and the graphite particles are close to spherical with the aspect ratio of 1 or more and 5 or less, thus making electric current unlikely to be concentrated, and then making it possible to suppress the non-uniform expansion of the negative electrode. In addition, since the graphite particles are close to spherical as described above, the low orientation of the graphite particles disposed in the active material layer makes the particles likely to be orientated at random, thus making it possible to suppress the non-uniform expansion of the negative electrode. Furthermore, the graphite particles are close to spherical, thereby making the adjacent graphite particles less likely to be caught by each other, making the graphite particles appropriately slipping on each other, and making the graphite particles likely to be maintained in a condition close to the closest packing even if the particles are expanded. As described above, according to the present embodiment, even if the graphite particles are expanded, the particles are presumed to expand in a relatively uniform manner and slide on each other in an appropriate manner, thereby maintaining the negative active material layer in which the graphite particles have a high packing ratio, and thus making it possible to suppress the expansion of the negative electrode during initial charge. In addition, the negative active material layer of the energy storage device includes solid graphite particles that have an aspect ratio of 1 or more and 5 or less as a main component. These graphite particles themselves with fewer voids therein make the particle shapes less likely to be deformed and make the shapes close to spherical, thus making the adjacent graphite particles less likely to be caught by each other, and making the graphite particles likely to have the closest packing. For this reason, for the energy storage device including the graphite particles, the density of the negative active material layer can be set within the range mentioned above, even without the pressure applied to the negative active material layer or with a relatively low pressure applied thereto.

An aspect of the present embodiment is an energy storage device including an electrode assembly that has a negative electrode and a positive electrode, where the negative electrode has a negative electrode substrate, and a negative active material layer containing a negative active material and disposed along at least one surface of the negative electrode substrate, the negative active material includes solid graphite particles as a main component, the solid graphite particles have an aspect ratio of 1 or more and 5 or less, and R2/R1 that is the ratio of the surface roughness R2 of the negative electrode substrate in the region without the negative active material layer disposed to the surface roughness R1 of the negative electrode substrate in the region with the negative active material layer disposed is 0.90 or more.

As more pressure is applied to the negative electrode substrate, the region with the negative active material layer formed becomes coarser, and the R2/R1 is smaller. In other words, in the case where the negative electrode substrate has no pressure applied thereto, the surface roughness has almost the same value in the region with the negative active material layer disposed and the region without the negative active material layer disposed (a so-called exposed region of the negative electrode substrate). More specifically, R2/R1 will be brought close to 1. In the energy storage device, the R2/R1 mentioned above is 0.90 or more, without the pressure applied to the negative active material layer or with a low pressure applied thereto. Thus, the graphite particles themselves have low residual stress, and the non-uniform expansion of the negative electrode due to the release of the residual stress can be suppressed. In addition, the density in the graphite particles is uniform since the graphite particles are solid, and the graphite particles are close to spherical with the aspect ratio of 1 or more and 5 or less, thus making electric current unlikely to be concentrated, and then making it possible to suppress the non-uniform expansion of the negative electrode. In addition, since the graphite particles are close to spherical as described above, the low orientation of the graphite particles disposed in the active material layer makes the particles likely to be orientated at random, thus making it possible to suppress the non-uniform expansion of the negative electrode. Furthermore, the graphite particles are close to spherical, thereby making the adjacent graphite particles less likely to be caught by each other, making the graphite particles appropriately slipping on each other, and making the graphite particles likely to be maintained in a condition close to the closest packing even if the particles are expanded. As described above, according to the present embodiment, even if the graphite particles are expanded, the particles are presumed to expand in a relatively uniform manner and slide on each other in an appropriate manner, thereby maintaining the negative active material layer in which the graphite particles have a high packing ratio, and thus making it possible to suppress the expansion of the negative electrode during initial charge.

The negative active material preferably further contains non graphitizable carbon. The negative active material further contains non-graphitizable carbon, thereby making it possible to obtain an energy storage device that has an enhanced suppressive effect on the expansion of the negative electrode during initial charge.

The energy storage device preferably includes an electrode assembly obtained by winding the stacked negative electrode and positive electrode, and the electrode assembly preferably has a hollow region in the center. The electrode assembly has the hollow region in the center, thereby making it possible to keep the active material layer from being peeled off by bending the negative electrode or positive electrode located near the center, and the enhanced suppressive effect on the expansion of the negative electrode during initial charge makes it possible to obtain an energy storage device that can suppress uneven charge discharge caused by the increased interelectrode distance, which has been conventionally caused in an electrode assembly with a hollow region.

The energy storage device preferably includes a pressure-sensitive breaking mechanism that cuts off the electrical connection between the negative electrode and the positive electrode, or a pressure-sensitive short-circuiting mechanism that electrically short circuits the negative electrode and the positive electrode outside the electrode assembly, in the case where the internal pressure rises to a predetermined pressure. When the energy storage device is subjected to overcharge or the decomposition of the electrolyte solution, the internal pressure or temperature may rise significantly to the extent that it is not possible to deliver the charge-discharge performance required for the energy storage device. For that reason, conventionally, further improvements in safety are made by providing energy storage devices with a pressure-sensitive breaking mechanism that cuts off the electrical connection between the negative electrode and the positive electrode or a pressure-sensitive short-circuiting mechanism that electrically short-circuits the negative electrode and the positive electrode, for example, with a diaphragm inverted, in the case where the internal pressure rises due to overcharge or the like. These mechanisms have, however, the possibility of increasing the internal pressures of the energy storage devices with the increased expansions of the plates, thereby causing the above-mentioned mechanisms to operate at early stages. The energy storage device the mechanism that cuts off the electrical connection between the negative electrode and the positive electrode or the mechanism that electrically short-circuits the negative electrode and the positive electrode outside the electrode assembly, thereby allowing the safety to be further improved, and the energy storage device has an enhanced suppressive effect on the expansion of the negative electrode during initial charge, thereby making it possible to keep the above-mentioned mechanism from operating at early stages.

The energy storage device preferably includes a case that houses the electrode assembly, with the inner surface of the case in direct or indirect contact with the outer surface of the electrode assembly, and a pressurizing member that pressurizes the case from the outside. The energy storage device has an enhanced suppressive effect on the expansion of the negative electrode during initial charge, thereby possibly decreasing the force of friction against the inner surface of the case due to the expansion of the electrode assembly, and also causing the electrode assembly to move inside the case. The energy storage device includes the pressurizing member that pressurizes the case from the outside, thereby making it possible to increase the force of friction between the case and the electrode assembly and improve the holding ability for the electrode assembly.

Another aspect of the present embodiment is a method for manufacturing an energy storage device, including: preparing a negative electrode where a negative active material layer containing a negative active material is disposed along at least one surface of a negative electrode substrate; preparing a positive electrode where a positive active material layer containing a positive active material is disposed along at least one surface of a positive electrode substrate; and stacking the negative electrode and the positive electrode, where the negative active material includes solid graphite particles, the solid graphite particles have an aspect ratio of 1 or more and 5 or less, and the negative electrode is not subjected to pressing the negative active material layer before stacking the negative electrode and the positive electrode. According to the method for manufacturing the energy storage device, the negative electrode is not subjected to pressing the negative active material layer before stacking the negative electrode and the positive electrode, thereby making it possible to manufacture an energy storage device that has an enhanced suppressive effect on the expansion of the negative electrode during initial charge.

Hereinafter, the energy storage device according to the present embodiment will be described in detail with reference to the drawings.

<Energy Storage Device>

First Embodiment

As an example of the energy storage device, a nonaqueous electrolyte energy storage device will be described below, which serves as a secondary battery. The nonaqueous electrolyte energy storage device includes an electrode assembly, a nonaqueous electrolyte, and a case that houses the electrode assembly and the nonaqueous electrolyte. The electrode assembly has a negative electrode and a positive electrode. The electrode assembly typically forms a wound electrode assembly obtained by winding a positive electrode and a negative electrode stacked with a separator interposed therebetween, or a stacked electrode obtained by alternating a positive electrode and a negative electrode with a separator interposed therebetween. In addition, the nonaqueous electrolyte with which the separator is impregnated is interposed between the positive electrode and the negative electrode.

[Negative Electrode]

The negative electrode has a negative electrode substrate and a negative active material layer. The negative active material layer contains the negative active material, and is disposed along at least one surface of the negative electrode substrate. The negative active material layer according to the first embodiment of the present invention is disposed in an unpressed shape.

(Negative Electrode Substrate)

The negative electrode base substrate is a substrate with conductivity. As the material of the negative electrode substrate, a metal such as copper, nickel, stainless steel, nickel plated-steel, or an alloy thereof is used, and copper or a copper alloy is preferable. In addition, examples of the form of the negative electrode substrate include a foil and a vapor deposition film, and the foil is preferable in terms of cost. More specifically, copper foil is preferable as the negative electrode substrate. Examples of the copper foil include rolled copper foil and electrolytic copper foil. It is to be noted that, having "conductivity" means that the volume resistivity measured in accordance with JIS-H0505 (1975) is $1\times10^7$ Ω·cm or less, and "non-conductivity" means that the volume resistivity is more than $1\times10^7$ Ω·cm.

The upper limit of the average thickness of the negative electrode substrate may be, for example, 30 μm, but preferably 20 μm, and more preferably 10 μm. The average thickness of the negative electrode substrate is adjusted to be equal to or less than the upper limit mentioned above, thereby allowing the energy density to be further increased. On the other hand, the lower limit of this average thickness may be, for example, 1 μm, or may be 5 μm. It is to be noted that the average thickness refers to the average value for the thicknesses measured at ten points arbitrarily selected.

[Negative Active Material Layer]

The negative active material layer is disposed directly along at least one surface of the negative electrode substrate, or with an intermediate layer interposed therebetween. The negative active material layer is formed from a so-called negative composite containing a negative active material. In addition, the negative active material contains solid graphite particles as a main component. The negative composite contains optional components such as a conductive agent, a binder (binder), a thickener, and a filler, if necessary.

As the negative active material, a material capable of storing and releasing lithium ions is typically used. In the energy storage device according to the first embodiment of the present invention, the negative active material includes solid graphite particles as a main component.

(Solid Graphite Particle)

The solid graphite particle means a graphite particle that is filled inside substantially without voids. As described above, in this specification, the solid graphite particle means a graphite particle where the area ratio R excluding voids in a particle to the area of the entire particle is 95% or more in the cross section of the particle observed in an SEM image obtained with the use of a scanning electron microscope. The area ratio R can be determined as follows.

(1) Preparation of Measurement Sample

The powder of negative active material particles to be subjected to measurement is fixed with a thermosetting resin. For the negative active material particles fixed with the resin, cross sections are exposed with the use of a cross-section polisher to prepare a measurement sample.

(2) Acquisition of SEM Image

For acquiring the SEM image, JSM-7001F (from JEOL Ltd.) is used as a scanning electron microscope. The SEM image is obtained by observing a secondary electron image. The accelerating voltage is adjusted to 15 kV. The observing magnification is set such that the number of negative active material particles appearing in one field of view is 3 or more and 15 or less. The obtained SEM image is saved as an image file. In addition, conditions such as a spot diameter, a working distance, an irradiation current, a luminance, and a focus are appropriately set such that the contours of the negative active material particles are sharply defined.

(3) Clipping Contour of Negative Active Material Particle

With the use of the image clipping function of the image editing software Adobe Photoshop Elements 11, the contours of the negative active material particles are clipped from the acquired SEM image. This contour clipping is performed by selecting the outside of the contours of the active material particles with the use of the quick selection tool and editing the part excluding the negative active material particles into a black background. In this regard, if the number of negative active material particles successfully subjected to the contour clipping is less than 3, the SEM image is acquired again until the number of negative active material particles successfully subjected to the contour clipping is 3 or more.

(4) Binarization Processing

For the image of the first negative active material particle 5 among the clipped negative active material particles, the image analysis software PopImaging 6.00 is used to perform binarization processing with, as a threshold value, a set concentration that is 20% lower than the concentration for the maximum intensity. In accordance with the binarization processing, the area on the lower concentration side is calculated, thereby providing "the area S1 excluding voids in the particle".

Then, the same image of the first negative active material particle as before is subjected to binarization processing with a concentration of 10 as a threshold value. In accordance with the binarization processing, the outer edge of the negative active material particles is determined, and the area inside the outer edge is calculated, thereby providing "the area S0 of the whole particle".

With the use of the above-mentioned S1 and S0 calculated, the ratio of S1 to S0 (that is, S1/S0) is calculated to calculate "the area ratio R1 excluding voids in the particle to the area of the whole particle" in the first negative active material particle.

The images of the second and subsequent negative active material particles among the clipped negative active material particles are each also subjected to the above-mentioned binarization processing, and the area S1 and the area S0 are calculated. Based on these calculated areas S1 and S0, the area ratios R2, R3, . . . of each negative active material particle are calculated.

(5) Determination of Area Ratio R

The average value for all of the area ratios R1, R2, R3, . . . calculated in accordance with the binarization processing is calculated, thereby determining "the area ratio R of the negative active material particles excluding voids in the particles to the area of the whole particles".

Graphite is a carbon substance in which the average lattice spacing d(002) of the (002) plane, measured from the X-ray diffractometry in a discharge state is less than 0.340 nm. The d(002) of the solid graphite particles mentioned above is preferably less than 0.338 nm. In addition, the average lattice spacing d(002) of the solid graphite particles is preferably 0.335 nm or more. The spherical solid graphite particles preferably have a shape close to a true sphere, but may have an elliptic shape, an elliptic shape, or the like, and may have irregularities at the surfaces. The solid graphite particles may include particles that have multiple solid graphite particles aggregated.

The lower limit of the aspect ratios of the solid graphite particles is 1.0 (for example, 1.5), preferably 2.0. In some aspects, the aspect ratios of the solid graphite particles may be 2.2 or more (for example, 2.5 or more). In contrast, the upper limit of the aspect ratios of the solid graphite particles is 5.0 (for example, 4.5), and is preferably 4.0. In some aspects, the aspect ratios of the solid graphite particles may be 3.5 or less (for example, 3.0 or less). The aspect ratios of the solid graphite particles fall within the range mentioned above, thereby making the graphite particles close to spherical, making electric current unlikely to be concentrated, and then making it possible to suppress the non-uniform expansion of the negative electrode.

As described above, the term "aspect ratio" means a value A/B that refers to the ratio of the longest diameter A of a particle to the longest diameter B in a direction perpendicular to the diameter A, in the cross section of the particle observed in an SEM image obtained with the use of a scanning electron microscope. The aspect ratio can be determined as follows.

(1) Preparation of Measurement Sample

Used is the above-described measurement sample with the exposed cross section, used for determining the area ratio R.

(2) Acquisition of SEM Image

For acquiring the SEM image, JSM-7001F (from JEOL Ltd.) is used as a scanning electron microscope. The SEM image is obtained by observing a secondary electron image. The accelerating voltage is adjusted to 15 kV. The observing magnification is set such that the number of negative active material particles appearing in one field of view is 100 or more and within 1000. The obtained SEM image is saved as an image file. In addition, conditions such as a spot diameter, a working distance, an irradiation current, a luminance, and a focus are appropriately set such that the contours of the negative active material particles are sharply defined.

(3) Determination of Aspect Ratio

From the acquired SEM images, one hundred negative active material particles are randomly selected, and for each particle, the longest diameter A of the negative active material particle and the longest diameter B in a direction perpendicular to the diameter A are measured, and the value A/B is calculated. The aspect ratio of the negative active material particles is determined by calculating the average value for all of the calculated values A/B.

The median diameter of the solid graphite particles is not particularly limited, but from the viewpoint of improving the power of the energy storage device, the upper limit is preferably 10 μm (for example, 8 μm), and more preferably 5 μm. For example, the median diameter of the solid graphite particles is preferably less than 5 μm, and more preferably 4.5 μm or less. In some aspects, the median diameter of the solid graphite particles may be 4 μm or less, or 3.5 μm or less (for example, 3 μm or less). From the viewpoint of ease of handling during manufacture or manufacturing cost, the lower limit is preferably 1 μm, and more preferably 2 μm. The technique disclosed herein can be preferably put into practice in an aspect in which the median diameter of the solid graphite particles is 1 μm or more and less than 5 μm (further, 1.5 μm or more and 4.5 μm or less, particularly 2 μm or more and 4 μm or less).

Suitable examples of the solid graphite particles disclosed herein include that particles have an aspect ratio of 1 or more and 5 or less and a median diameter of 10 μm or less; particles that have an aspect ratio of 1.2 or more and 4.5 or less and a median diameter of less than 5 μm; particles that have an aspect ratio of 1.3 or more and 4 or less and a median diameter of 4.5 μm or less; and particles that have an aspect ratio of 1.5 or more and 3.5 or less and a median diameter of 4 μm or less. The use of such solid graphite particles that are small in diameter and close in shape to a spherical can produce the previously described effect more effectively exhibited.

It is to be noted that the "median diameter" means a value (D50) at which the volume-based cumulative distribution calculated in accordance with JIS-Z8819-2 (2001) is 50%. Specifically, the median diameter can be a value measured by the following method. The measurement is performed with the use of a laser diffraction-type particle size distribution measurement apparatus ("SALD-2200" from Shimadzu Corporation) as a measurement apparatus, and Wing SALD-2200 as measurement control software. With a scattering-type measurement mode employed, a wet cell in which a dispersion of a measurement sample dispersed in a dispersion solvent is circulated is irradiated with laser light, and a scattered light distribution is obtained from the measurement sample. Then, the scattered light distribution is approximated with a lognormal distribution, and the particle size corresponding to a cumulative frequency of 50% is defined as the median diameter (D50).

For the solid graphite particles, graphite particles that have an appropriate aspect ratio and shape can be appropriately selected from among various known graphite particles and then used. Examples of such known graphite particles include artificial graphite particles and natural graphite particles. In this regard, the artificial graphite is a general term for artificially produced graphite, and the natural graphite is a general term for graphite obtained from natural minerals. Specific examples of the natural graphite particles include scaly graphite (flake graphite), lump graphite, and earthy graphite. The solid graphite particles can be flattened scaly natural graphite particles or spheroidized natural graphite particles obtained by spheroidizing the scaly graphite. In a preferred aspect, the solid graphite particles are artificial graphite particles. The use of the solid artificial graphite particles more produces the previously described effect. The solid graphite particles may be graphite particles that have surfaces coated (for example, coated with amorphous carbon).

The value R of the solid graphite particles can be approximately 0.25 or more (for example, 0.25 or more and 0.8 or less). In this regard, the "value R" refers to the ratio ($I_{D1}/I_{G1}$) of the peak intensity ($I_{D1}$) of a D band to the peak intensity ($I_{G1}$) of a G band in a Raman spectrum. The value R of the solid graphite particles is, for example, 0.28 or more (for example, 0.28 or more and 0.7 or less), and typically 0.3 or more (for example, 0.3 or more and 0.6 or less). In some aspects, the value R of the solid graphite particles may be 0.5 or less, or 0.4 or less.

In this regard, the "Raman spectrum" will be obtained by Raman spectrometry in the range of 200 cm 1 to 4000 cm$^{-1}$ under the conditions of wavelength: 532 nm (YAG laser), grating: 600 g/mm, and measurement magnification: 100-fold magnification with the use of "HRRevolution" from Horiba, Ltd. In addition, "the intensity ratio ($I_{G1}$) of the G band peak" and "the intensity ratio ($I_{D1}$) of the D band peak" can be determined by the following method. First, the intensity of the obtained Raman spectrum at 4000 cm-1 as the base intensity is normalized with the maximum intensity (for example, the intensity of the G band) in the measurement range mentioned above. Next, the obtained spectrum is subjected to fitting with the use of a Lorentz function, and the respective intensities of the G band around 1580 cm 1 and the D band around 1350 cm$^{-1}$ are calculated, and referred to as "the peak intensity ($I_{G1}$) of the G band" and "the peak intensity ($I_{D1}$) of the D band".

The true density of the solid graphite particles is preferably 2.1 g/cm$^3$ or more. The use of the solid graphite particles with such a high true density allows the energy density to be further increased. In contrast, the upper limit of the true density of the solid graphite particles is, for example, 2.5 g/cm$^3$. The true density is measured by a gas volume method with a pycnometer that uses a helium gas.

The lower limit of the content of the solid graphite particles with respect to the total mass of the negative active material is preferably 60% by mass. In some aspects, the content of the solid graphite particles with respect to the total mass of the negative active material may be, for example, 70% by mass or more, or 80% by mass. In the case where the negative active material contains no other negative active material than the solid graphite particles, the lower limit of the content of the solid graphite particles is preferably 90% by mass. The content of the solid graphite particles is equal to or higher than to the lower limit mentioned above, thereby allowing the charge discharge efficiency to be further improved. In contrast, the upper limit of the content of the solid graphite particles with respect to the total mass of the negative active material may be, for example, 100% by mass.

The negative active material disclosed herein may include carbon particles other than the above-mentioned solid graphite particles. Examples of such carbon particles other than the solid graphite particles include hollow graphite particles and non-graphitic carbon particles. Examples of the non-graphitic carbon particles include non-graphitizable carbon particles and graphitizable carbon particles. The term "non-graphitizable carbon" herein refers to a carbon material in which the average lattice spacing d(002) of the (002) plane, measured from X-ray diffractometry before charge-discharge or in a discharge state, is 0.36 nm or more and 0.42 nm or less). The "graphitizable carbon" refers to a carbon material in which the above-mentioned average lattice spacing d(002) is 0.34 nm or more and less than 0.36 nm.

(Non-Graphitizable Carbon)

In the case where the negative active material contains carbon particles other than the solid graphite particles, the carbon particles are preferably non-graphitizable carbon particles. Non-graphitizable carbon typically has fine graphite crystals arranged in random directions and have voids in the order of nanometers between the crystal layers. The average particle size of the non-graphitizable carbon may be, for example, 1 μm or more and 10 μm or less, and is preferably 2 μm or more and 5 μm or less from the viewpoint of enhancing the packing property of the negative active material in the negative electrode. As the non-graphitizable carbon, one type of carbon may be used alone, or multiple types of carbon may be used in combination.

In the case where the negative active material contains non-graphitizable carbon, the lower limit of the content of the non-graphitizable carbon with respect to the total mass of the negative active material is preferably 5% by mass, and more preferably 10% by mass. In contrast, the upper limit of the content of the non-graphitizable carbon with respect to the total mass of the negative active material is preferably 40% by mass, and more preferably 30% by mass. The content of the non-graphitizable carbon falls within the range mentioned above, thereby making it possible to reduce the porosity of the negative electrode and obtain an energy storage device including the negative electrode with the increased packing density of the active material.

(Other Negative Active Materials)

The negative active material disclosed herein may contain a negative active material made of a material other than the carbon particles (that is, the solid graphite particles and the carbon particles other than the solid graphite particles). Examples of the other negative active material (hereinafter, also referred to as a "non-carbonaceous active material") that may be contained besides the carbon particles mentioned above include semimetals such as Si, metals such as Sn, oxides of these metals and semimetals, or composites of these metals and semi-metals with carbon materials. The content of the non-carbonaceous active material is appropriately, for example, 30% by mass or less, preferably 20% by mass or less, and more preferably 10% by mass or less, based on the total mass of the negative active material. In some aspects, the content of the non-carbonaceous active material may be 5% by mass or less (for example, 1% by mass or less, typically 0% by mass) based on the total mass of the negative active material.

(Other Optional Components)

The solid graphite particles and the non-graphitizable carbon also have conductivity, and conductive agent include metals, conductive ceramics, graphite such as acetylene black, and carbon materials other than non graphitizable carbon.

Examples of the binder include elastomers such as an ethylene-propylene diene rubber (EPDM), sulfonated EPDM, a styrene-butadiene rubber (SBR), and fluororubbers; thermoplastic resins other than elastomers, such as fluororesins (polytetrafluoroethylene (PTFE), polyvinylidene fluoride (PVDF), etc.), polyethylene, polypropylene, and polyimide, and polysaccharide polymers.

Examples of the thickener include polysaccharide polymers such as carboxymethyl cellulose (CMC) and methyl cellulose. In addition, in the case where the thickener has a functional group that reacts with lithium, this functional group is preferably deactivated in advance by methylation or the like.

The filler mentioned above is not particularly limited. Examples of the main component of the filler include polyolefins such as polypropylene and polyethylene, silica, alumina, zeolite, and glass.

(Intermediate Layer)

The intermediate layer mentioned above, which is a coating layer on the surface of the negative electrode substrate, includes conductive particles such as carbon particles, thereby reducing the contact resistance between the negative electrode substrate and the negative composite layer. The intermediate layer may cover a part of the negative electrode substrate or may cover the entire surface thereof. The negative electrode substrate may have a region in which the intermediate layer is stacked and the negative active material layer is not stacked. The structure of the intermediate layer is not particularly limited, and can be formed from, for example, a composition containing a resin binder and conductive particles. It is to be noted that, having "conductivity" means that the volume resistivity measured in accordance with JIS-H0505 (1975) is $1 \times 10^7$ Ω·cm or less.

The porosity of the negative electrode is preferably 40% or lower. The porosity of the negative electrode is 40% or lower, thereby allowing the energy density of the energy storage device to be further increased. In addition, the porosity of the negative electrode is preferably 25% or higher. The "porosity" of the negative electrode has a value on a volumetric basis, which is a calculated value calculated from the mass and true density of the constituent included in the active material layer, and the thickness of the active material layer.

[Positive Electrode]

The positive electrode has a positive electrode substrate and a positive active material layer. The positive active material layer contains a positive active material, and is disposed directly along at least one surface of the positive electrode substrate, or with an intermediate layer interposed therebetween.

The positive electrode substrate has conductivity. As the material of the substrate, a metal such as aluminum, titanium, tantalum, and stainless steel, or an alloy thereof is used. Among these materials, aluminum and aluminum alloys are preferable from the viewpoint of the balance among potential resistance, high conductivity, and cost. In addition, examples of the form of the positive electrode substrate include a foil and a vapor deposition film, and the foil is preferable in terms of cost. More specifically, the positive electrode substrate is preferably an aluminum foil. Further, examples of the aluminum or aluminum alloy can include A1085P and A3003P specified in JIS-H4000 (2014).

The positive active material layer is formed from a so-called positive composite containing a positive active material. In addition, the positive composite that forms the positive active material layer contains optional components such as a conductive agent, a binder (binder), a thickener, and a filler, if necessary.

Examples of the positive active material include a lithium metal composite oxide and a polyanion compound. Examples of the lithium metal composite oxide include $Li_xMO_y$ (M represents at least one transition metal), and specifically, $Li_xCoO_2$, $Li_xNiO_2$, $Li_xMnO_3$, $Li_xNi\alpha Co_{(1-\alpha)}O_2$, $Li_xNi\alpha Mn\beta Co_{(1-\alpha-\beta)}O_2$ that have a layered α-NaFeO$_2$-type crystalline structure, and $Li_xMn_2O_4$ and $Li_xNi\alpha Mn_{(2-\alpha)}O_4$ that have a spinel-type crystalline structure. Examples of the polyanion compound include $Li_wMe_x(XO_y)_z$ (Me represents at least one transition metal, and X represents, for example, P, Si, B, V, or the like), and specifically, $LiFePO_4$, $LiMnPO_4$, $LiNiPO_4$, $LiCOPO_4$, $Li_3V_2(PO_4)_3$, $Li_2MnSiO_4$, and $Li_2CoPO_4F$. The elements or polyanions in these compounds may be partially substituted with other elements or anion species. In the positive active material layer, one of these compounds may be used alone, or two or more of these compounds may be used in mixture.

The conductive agent is not particularly limited as long as the agent is a conductive material. Examples of such a conductive agent include graphite; carbon black such as furnace black, acetylene black, and ketjen black; metals; and conductive ceramics. Examples of the form of the conductive agent include powdery and fibrous forms.

Examples of the binder (binder) include thermoplastic resins such as fluororesins (polytetrafluoroethylene (PTFE), polyvinylidene fluoride (PVDF), and the like), polyethylene, polypropylene, and polyimide; elastomers such as an ethylene-propylene diene rubber (EPDM), sulfonated EPDM, a styrene-butadiene rubber (SBR), and fluororubbers; and polysaccharide polymers.

Examples of the thickener include polysaccharide polymers such as carboxymethyl cellulose (CMC) and methyl cellulose. In addition, in the case where the thickener has a functional group that reacts with lithium, this functional group is preferably deactivated in advance by methylation or the like.

The filler mentioned above is not particularly limited. Examples of the main component of the filler include polyolefins such as polypropylene and polyethylene, silica, alumina, zeolite, glass, and carbon.

The intermediate layer, which serves as a coating layer on the surface of the positive electrode substrate, contains conductive particles such as carbon particles, thereby reducing the contact resistance between the positive electrode substrate and the positive active material layer. The intermediate layer may cover a part of the positive electrode substrate or may cover the entire surface thereof. As with the negative electrode, the structure of the intermediate layer is not particularly limited, and can be formed from, for example, a composition containing a resin binder and conductive particles.

[Separator]

As the material of the separator, for example, a woven fabric, a non-woven fabric, a porous resin film, or the like is used. Among these materials, a porous resin film is preferable from the viewpoint of strength, and a non woven fabric is preferable from the viewpoint of liquid retention for the nonaqueous electrolyte. The main component of the separator is preferably, for example, a polyolefin such as polyethylene or polypropylene from the viewpoint of strength, and is preferably, for example, a polyimide, an aramid, or the like from the viewpoint of resistance to oxidative decomposition. Furthermore, these resins may be combined.

Further, an inorganic layer may be provided between the separator and the electrode (typically, the positive electrode). This inorganic layer is a porous layer also referred to as a heat resistant layer or the like. Further, a separator that has a porous resin film with an inorganic layer formed on one surface of the film can also be used. The inorganic layer is typically composed of inorganic particles and a binder, and may contain other components.

[Nonaqueous Electrolyte]

As the nonaqueous electrolyte, known nonaqueous electrolytes can be used, which are typically used for common nonaqueous electrolyte secondary batteries (energy storage devices). The nonaqueous electrolyte includes a nonaqueous solvent and an electrolyte salt dissolved in the nonaqueous solvent. It is to be noted that the nonaqueous electrolyte may be a solid electrolyte or the like.

As the nonaqueous solvent, known nonaqueous solvents can be used, which are typically used as nonaqueous solvents of nonaqueous electrolytes for common energy storage devices. Examples of the nonaqueous solvent include cyclic carbonates, chain carbonates, esters, ethers, amides, sulfones, lactones, and nitriles. Among these solvents, it is preferable to use at least the cyclic carbonate or the chain carbonate, and it is more preferable to use the cyclic carbonate and the chain carbonate in combination. In the case where the cyclic carbonate and the chain carbonate are used in combination, the volume ratio between the cyclic carbonate and the chain carbonate (cyclic carbonate:chain carbonate) is not particularly limited, but preferably, for example, 5:95 to 50:50.

Examples of the cyclic carbonate include ethylene carbonate (EC), propylene carbonate (PC), butylene carbonate (BC), vinylene carbonate (VC), vinyl ethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these cyclic carbonates, EC is preferable.

Examples of the chain carbonate include diethyl carbonate (DEC), dimethyl carbonate (DMC), ethyl methyl carbonate (EMC), and diphenyl carbonate, and among these chain carbonates, EMC is preferable.

As the electrolyte salt, known electrolyte salts can be used, which are typically used as electrolyte salts of nonaqueous electrolytes for common energy storage devices. Examples of the electrolyte salt mentioned above include lithium salts, sodium salts, potassium salts, magnesium salts, and onium salts, and the lithium salts are preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a hydrocarbon group in which hydrogen is substituted with fluorine, such as $LiSO_3CF_3$, $LIN(SO_2CF_3)_2$, $LIN(SO_2C_2F_5)_2$, $LIN(SO_2CF_3)(SO_2C_4F_3)$, $LiC(SO_2CF_3)_3$, and $LiC(SO_2C_2F_5)_3$. Among these salts, inorganic lithium salts are preferable, and $LiPF_6$ is more preferable.

The lower limit of the content of the electrolyte salt in the nonaqueous electrolyte is preferably 0.1 M, more preferably 0.3 M, further preferably 0.5 M, and particularly preferably 0.7 M. In contrast, the upper limit is not particularly limited, but preferably 2.5 M, more preferably 2 M, and further preferably 1.5 M.

Second Embodiment

In an energy storage device according to a second embodiment of the present invention, the negative active material includes solid graphite particles as a main component, the solid graphite particles have an aspect ratio of 1 or more and 5 or less, and the negative active material layer has a density of 1.20 g/cm³ or more and 1.55 g/cm³ or less. The negative active material layer increases in density as more pressure is applied to the negative active material layer with a roll press or the like. In other words, in the case where the negative active material layer is low in density, the pressure applied to the negative active material layer is low. In the energy storage device, the density of the negative active material layer including solid graphite particles as a main component is 1.20 g/cm³ or more and 1.55 g/cm³ or less, without the pressure applied to the negative active material layer or with a low pressure applied thereto. Thus, the graphite particles themselves have low residual stress, and the non-uniform expansion of the negative electrode due to the release of the residual stress can be suppressed. In addition, the density in the graphite particles is uniform since the graphite particles are solid, and the graphite particles are close to spherical with the aspect ratio of 1 or more and 5 or less, thus making electric current unlikely to be concentrated, and then making it possible to suppress the non-uniform expansion of the negative electrode. In addition, since the graphite particles are close to spherical as described above, the low orientation of the graphite particles disposed in the active material layer makes the particles likely to be orientated at random, thus making it possible to suppress the non-uniform expansion of the negative electrode. Furthermore, the graphite particles are close to spherical, thereby making the adjacent graphite particles less likely to be caught by each other, making the graphite particles appropriately slipping on each other, and making the graphite particles likely to be maintained in a condition close to the closest packing even if the particles are expanded. As described above, according to the present embodiment, even if the graphite particles are expanded, the particles are presumed to expand in a relatively uniform manner and slide on each other in an appropriate manner, thereby maintaining the negative active material layer in which the graphite particles have a high packing ratio, and thus making it possible to suppress the expansion of the negative electrode during initial charge. In addition, the negative active material layer of the energy storage device includes solid graphite particles that have an aspect ratio of 1 or more and 5 or less as a main component. These graphite particles themselves with fewer voids therein make the particle shapes less likely to be deformed and make the shapes close to spherical, thus making the adjacent graphite particles less likely to be caught by each other, and making the graphite particles likely to have the closest packing. For this reason, for the energy storage device including the graphite particles, the density of the negative active material layer can be set within the range mentioned above, even without the pressure applied to the negative active material layer or with a relatively low pressure applied thereto.

In the case where the negative active material includes solid graphite particles as a main component, the lower limit of the density of the negative active material layer is 1.20 g/cm³, preferably 1.30 g/cm³, and more preferably 1.40 g/cm³. In contrast, the upper limit of the density of the negative active material layer is 1.55 g/cm³, preferably 1.50 g/cm³. For example, the density of the negative active material layer can be less than 1.50 g/cm³ (for example, 1.49 g/cm³ or less). In some aspects, the density of the negative active material layer may be 1.45 g/cm³ or less. In addition, when the negative active material contains non graphitizable carbon in addition to the solid graphite particles as a main component, the lower limit of the density of the negative active material layer is 1.20 g/cm³, preferably 1.25 g/cm³. In contrast, the upper limit of the density of the negative active material layer is 1.55 g/cm³, preferably 1.45 g/cm³, and more preferably 1.40 g/cm³. The density of the negative active material layer falls within the range mentioned above, thereby making it possible to obtain an energy storage device that has an enhanced suppressive effect on the expansion of the negative electrode during initial charge.

Third Embodiment

In an energy storage device according to a third embodiment of the present invention, the negative active material includes solid graphite particles as a main component, the solid graphite particles have an aspect ratio of 1 or more and 5 or less, and R2/R1 that is the ratio of the surface roughness R2 of the negative electrode substrate in the region (exposed region) without the negative active material layer disposed (stacked) to the surface roughness R1 of the negative electrode substrate in the region with the negative active material layer disposed (stacked) is 0.90 or more. As for the negative electrode substrate, as more pressure is applied to the negative active material layer stacked on the negative electrode substrate, the surface roughness R1 of the region with the negative active material layer formed is increased, thus reducing the ratio R2/R1 to the surface roughness R2 of the region without the negative active material layer disposed. In other words, in the case where the negative electrode substrate has no pressure applied thereto, the surface roughness has almost the same value in the region with the negative active material layer disposed and the region without the negative active material layer disposed (for example, an exposed region of the negative electrode substrate in the case where the negative electrode has an exposed part of the negative electrode substrate). More specifically, the R2/R1 mentioned above will be brought close to 1. In the energy storage device, the foregoing means the above-mentioned R2/R1 of 0.90 or more, without the pressure applied to the negative active material layer stacked on the negative electrode substrate or with a low pressure applied thereto. Thus, the graphite particles themselves have low residual stress, and the non-uniform expansion of the negative electrode due to the release of the residual stress can be suppressed. In addition, the density in the graphite particles is uniform since the graphite particles are solid, and the graphite particles are close to spherical with the aspect ratio of 1 or more and 5 or less, thus making electric current unlikely to be concentrated, and then making it possible to suppress the non-uniform expansion of the negative electrode. In addition, since the graphite particles are close to spherical as described above, the low orientation of the graphite particles disposed in the active material layer makes the particles likely to be orientated at random, thus making it possible to suppress the non-uniform expansion of the negative electrode. Furthermore, the graphite particles are close to spherical, thereby making the adjacent graphite particles less likely to be caught by each other, making the graphite particles appropriately slipping on each other, and making the graphite particles likely to be maintained in a condition close to the closest packing even if the particles are expanded. As described above, according to the present embodiment, even if the graphite particles are expanded, the particles are presumed to expand in a relatively uniform manner and slide on each other in an appropriate manner, thereby maintaining the negative active material layer in which the graphite particles have a high packing ratio, and thus making it possible to suppress the expansion of the negative electrode during initial charge.

The "surface roughness" mentioned above means the value of the center line roughness Ra of the substrate surface (for the region with the active material layer formed, the surface after removing the active material layer), measured with a laser microscope in accordance with JIS-B0601 (2013). Specifically, the median diameter can be a value measured by the following method.

First, in the case where the negative electrode has an exposed part of the negative electrode substrate, the surface roughness of the part is measured in accordance with JIS-B0601 (2013) with the use of a commercially available laser microscope (device name "VK-8510" from KEYENCE CORPORATION), as the surface roughness R2 of the region without the negative active material layer disposed. In this regard, as the measurement conditions, the measurement region (area) is 149 μm×112 μm (16688 μm²), and the measurement pitch is 0.1 μm. Then, the negative active material layer and the other layers are removed from the negative electrode substrate by shaking the negative electrode with the use of an ultrasonic cleaner. The surface roughness R1 of the region with the negative active material layer formed is measured by the same method as for the surface roughness of the part where the negative electrode substrate is exposed. It is to be noted that in the case where the negative electrode has no exposed part of the negative electrode substrate (for example, in the case where the entire surface of the negative electrode substrate is covered with the intermediate layer), the surface roughness R2 of the region without the negative active material layer disposed (for example, the region covered with the intermediate layer, and provided without the negative active material layer disposed) will be measured by the same method). The shaking with an ultrasonic cleaner used can be performed by shaking while immersing in water for 3 minutes and then in ethanol for 1 minute with the use of a desktop ultrasonic cleaner "2510J-DTH" from Branson Ultrasonics, Emerson Japan, Ltd.

The lower limit of the surface roughness ratio (R2/R1) is preferably 0.92, and more preferably 0.94, without the pressure applied to the negative active material layer or with a low pressure applied thereto. In contrast, the upper limit of the surface roughness ratio (R2/R1) is preferably 1.10, and more preferably 1.05.

[Specific Configuration of Energy Storage Device]

Figure 2:
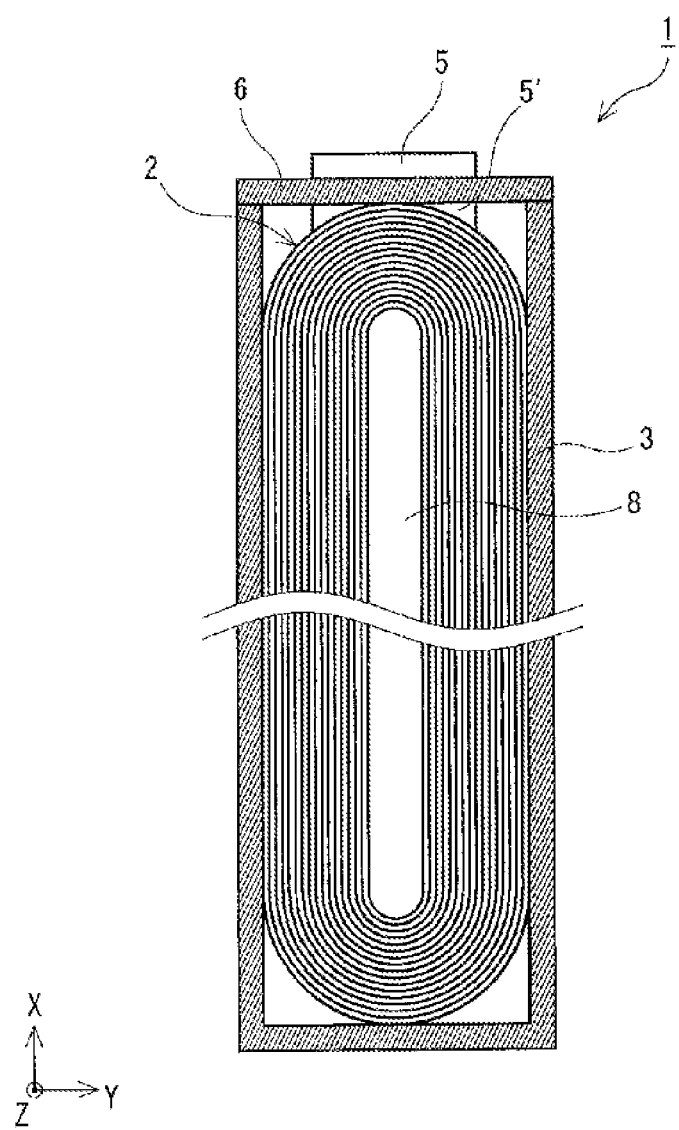
FIG. 2 is a schematic cross-sectional view of an energy storage device according to an embodiment of the present invention.

Next, the specific configuration example of an energy storage device according to an embodiment of the present invention will be described. FIG. 1 is a schematic exploded perspective view illustrating an electrode assembly and a case of a nonaqueous electrolyte energy storage device that is an energy storage device according to an embodiment of the present invention. FIG. 2 is a schematic cross-sectional view of the nonaqueous electrolyte energy storage device in FIG. 1. The nonaqueous electrolyte energy storage device 1 includes an electrode assembly 2, a positive electrode current collector 4' and a negative electrode current collector 5' connected to both ends of the electrode assembly 2, and a case 3 that houses the assembly and the current collectors. The nonaqueous electrolyte energy storage device 1 has the electrode assembly 2 housed in the case 3, and a nonaqueous electrolyte disposed in the case 3. The electrode assembly 2 is formed by winding, into a flattened form, a positive electrode 10 including a positive active material and a negative electrode 12 including a negative active material with a separator 11 interposed therebetween. In the present embodiment, the winding-axis direction of the electrode assembly 2 is defined as the Z-axis direction, and the long-axis direction in a cross section perpendicular to the Z axis of the electrode assembly 2 is defined as the X-axis direction. Further, the direction orthogonal to the Z axis and the X axis is defined as the Y-axis direction.

An exposed region of a positive electrode substrate without any positive active material layer formed is formed at an end of the positive electrode 10 in one direction. Further, an exposed region of a negative electrode substrate without any negative active material layer formed is formed at an end of the positive electrode 12 in one direction. The positive electrode current collector 4' is electrically connected to the exposed region of the positive electrode substrate by sandwiching with a clip or welding, and the negative electrode current collector 5' is similarly electrically connected to the exposed region of the negative electrode substrate. The positive electrode 10 is electrically connected to a positive electrode terminal 4 through the positive electrode current collector 4', and the negative electrode 12 is electrically connected to a negative electrode terminal 5 through the negative electrode current collector 5'.

(Case)

The case 3 is a rectangular parallelepiped housing that houses the electrode assembly 2, the positive electrode current collector 4', and the negative electrode current collector 5', and opens on one surface (upper surface) perpendicular to the second direction (X direction). Specifically, the case 3 has a bottom surface, a pair of long side surfaces opposed to the third direction (Y direction), and a pair of short side surfaces opposed to the first direction (Z direction). Further, the inner surface of the case 3 has direct contact with the outer surface (typically, the separator) of the electrode assembly 2. The case 3 may be provided with a spacer, a sheet, or the like interposed between the case 3 and the electrode assembly 2. The material of the spacer, the sheet, or the like is not particularly limited as long as the material has insulating properties. In the case where the case 3 includes a spacer, a sheet, or the like, the inner surface of the case 3 has indirect contact with the outer surface of the electrode assembly 2 with the spacer, the sheet, or the like interposed therebetween.

The upper surface of the case 3 is covered with a lid 6. The case 3 and the lid 6 are made of a metal plate. As the material of this metal plate, for example, aluminum can be used.

Further, the lid 6 is provided with a positive electrode terminal 4 and a negative electrode terminal 5 for external conduction. The positive electrode terminal 4 is connected to the positive electrode current collector 4', and the negative electrode terminal 5 is connected to the negative electrode current collector 5'. Furthermore, in the case where the power storage element is a nonaqueous electrolyte energy storage device, a nonaqueous electrolyte (electrolyte solution) is injected into the case 3 from an injection hole, not shown, provided in the lid 6.

(Electrode Assembly)

The electrode assembly 2 has the positive electrode 10, the negative electrode 12, and the separator 11 that insulates the electrodes, and has the positive electrode 10 and negative electrode alternately laminated with the separator 11 interposed therebetween. The electrode assembly 2 is a wound electrode assembly obtained by winding, into a flattened form, a sheet body including the positive electrode 10, the negative electrode 12, and the separator.

The electrode assembly 2 preferably has a hollow region in the center 8. Further, in the case where the electrode assembly 2 is composed of the positive electrode 10 and the negative electrode 12 wound around a winding core with the separator 11 interposed between the electrodes, the electrode assembly 2 preferably has a hollow region in the center 8 of the electrode assembly, with a hollow structure as the internal structure of the winding core, or partially with a gap out of close contact with the outer surface of the winding core. In the case where a wound type electrode assembly obtained by winding stacked negative electrodes and positive electrodes has a hollow without any electrode plate or separator as the innermost periphery of the electrode assembly, the negative electrode may partially move into the hollow if the negative electrode expands. In particular, because the negative electrode near the inner periphery is close to the hollow, the negative electrode may move toward the hollow, thereby resulting in an increased interelectrode distance between the positive electrodes and the negative electrodes. The behavior at the inner periphery of such a wound-type electrode assembly is likely to be caused in the case of the outer peripheral surface of the electrode assembly in contact with the inner surface of the case, because the electrode assembly is unlikely to move toward the outer peripheral surface. As described above, with an increased interelectrode distance caused between the positive electrodes and the negative electrode, the part with the increased interelectrode distance has a resistance increased, thereby making the charge-discharge reaction less likely to be developed, and then leading to the charge-discharge reaction concentrated in the region near the part with the increased interelectrode distance. Because of this charge-discharge reaction concentrated, uneven charge-discharge will be expected to occur near the inner periphery. Whether the uneven charge-discharge occurs or not can be observed by examining whether the color of the negative active material layer is uneven or not at the inner periphery of the negative electrode plate removed from the disassembled energy storage device. In this regard, in the case where the discolored part of the negative active material layer extends over the entire area in the width direction (non-longitudinal direction) of the negative electrode plate, uneven charge-discharge is believed to occur due to the increased interelectrode distance.

The electrode assembly 2 has the hollow region in the center 8, thereby making it possible to keep the active material layer from being peeled off by bending the negative electrode or positive electrode located near the center 8, and the enhanced suppressive effect on the expansion of the negative electrode during initial charge makes it possible to obtain an energy storage device that can suppress uneven charge discharge caused by the increased interelectrode distance, which has been conventionally caused in an electrode assembly with a hollow region.

The material of the winding core is not particularly limited as long as the material has insulating properties and has stability in the electrolyte solution. Examples of the material of the winding core include polyethylene and polypropylene.

(Pressure-Sensitive Electrically Disconnecting Mechanism and Pressure-Sensitive Electrically Short-Circuiting Mechanism)

The energy storage device preferably includes a pressure-sensitive breaking mechanism that cuts off the electrical connection between the negative electrode and the positive electrode, or a pressure-sensitive short-circuiting mechanism that electrically short-circuits the negative electrode and the positive electrode outside the electrode assembly, in the case where the internal pressure rises to a predetermined pressure (preferably a pressure of 0.2 MPa or higher and 1.0 MPa or lower). When the energy storage device is subjected to overcharge or the decomposition of the electrolyte solution, the internal pressure or temperature may rise significantly to the extent that it is not possible to deliver the charge-discharge performance required for the energy storage device. For that reason, conventionally, further improvements in safety are made by providing energy storage devices with a mechanism that cuts off the electrical connection between the negative electrode and the positive electrode or electrically short-circuits the negative electrode and the positive electrode outside the electrode assembly, for example, with a diaphragm inverted, in the case where the internal pressure rises due to overcharge or the like. These mechanisms have, however, the possibility of increasing the internal pressures of the energy storage devices with the increased expansions of the plates, thereby causing the above-mentioned mechanisms to operate at early stages. The energy storage device the mechanism that cuts off the electrical connection between the negative electrode and the positive electrode or the mechanism that electrically short-circuits the negative electrode and the positive electrode outside the electrode assembly, thereby allowing the safety to be further improved, and the energy storage device has an enhanced suppressive effect on the expansion of the negative electrode during initial charge, thereby making it possible to keep the above-mentioned mechanism from operating at early stages.

These mechanisms are operated by increasing the internal pressure of the battery in case of an event such as overcharge, with, in the electrolyte solution, a compound that promotes gas generation during a temperature rose or a voltage rise.

The pressure sensitive electrically disconnecting mechanism is provided, for example, in a conductive path between the positive electrode and the positive electrode terminal, a conductive path between the negative electrode and the negative electrode terminal, or the like. When the pressure-sensitive electrically disconnecting mechanism is operated, no charge current flows, thus allowing the voltage of the energy storage device to be kept from being increased, and further improving the safety in the case of overcharge. In the case of the pressure sensitive electrically disconnecting mechanism, for example, when the internal pressure of the energy storage device is increased by the energy storage device overcharged, the central part of the diaphragm is lifted to break the conductive path and then interrupt the current. Thus, further charge is blocked in the case of the energy storage device overcharged.

The pressure-sensitive electrically short-circuiting mechanism is provided, for example, outside the electrode assembly (for example, the negative electrode current collector 5'). In the pressure-sensitive electrically short circuiting mechanism, in the case where the energy storage device overcharged makes the internal pressure of the energy storage device equal to or more than a predetermined value, the central part of the metallic diaphragm is lifted to bring the diaphragm into contact with the conductive member, thereby short circuiting the positive electrode and the negative electrode. This makes it possible to prevent the charge current from flowing into the electrode assembly. This short circuit is caused outside the electrode assembly, thus making it possible to keep the temperature of the energy storage device from being increased by the exothermic reaction of the active material layer as in the case of a short circuit caused inside the electrode assembly. In this manner, the safety in the case of the battery overcharged is further improved.

(Pressurizing Member)

The energy storage device preferably includes a pressurizing member that pressurizes the case 3 from the outside. The energy storage device has an enhanced suppressive effect on the expansion of the negative electrode during initial charge, thereby possibly decreasing the force of friction against the inner surface of the case due to the expansion of the electrode assembly, and also causing the electrode assembly to move inside the case. The energy storage device includes the pressurizing member that pressurizes the case from the outside, thereby making it possible to increase the force of friction between the case and the electrode assembly and improve the holding ability for the electrode assembly.

Examples of the pressurizing member include a restraining band or a metallic frame attached to the outer periphery of the case.

The energy storage device has, in the case where graphite is used for the negative active material, an enhanced suppressive effect on the expansion of the negative electrode during initial charge.

<Method for Manufacturing Energy Storage Device>

A method for manufacturing an energy storage device according to an embodiment of the present invention includes: preparing a negative electrode where a negative active material layer containing a negative active material is disposed along at least one surface of a negative electrode substrate; preparing a positive electrode where a positive active material layer containing a positive active material is disposed along at least one surface of a positive electrode substrate; and stacking the negative electrode and the positive electrode.

In the step of preparing the negative electrode, the negative active material layer containing the negative active material can be disposed along at least one surface of the negative electrode substrate by applying a negative composite to the negative electrode substrate. Specifically, the negative active material layer is disposed by, for example, applying a negative composite to the negative electrode substrate and drying the composite. As described above, the negative active material includes solid graphite particles, and the solid graphite particles have an aspect ratio of 1 or more and 5 or less.

The negative composite may be a negative composite paste further including a dispersion medium besides the optional components described above. As the dispersion medium, for example, an aqueous solvent such as water or a mixed solvent mainly composed of water; or an organic solvent such as N-methylpyrrolidone or toluene can be used.

In the step of preparing the positive electrode, the positive active material layer containing the positive active material can be disposed along one surface of the positive electrode substrate by applying a positive composite to the positive electrode substrate. Specifically, the positive active material layer is disposed by applying a positive composite to the positive electrode substrate and drying the composite. The conditions for the drying can be the same as in the negative active material layer forming step. Further, the positive composite may be a positive composite paste further including a dispersion medium besides the optional components described above. The dispersion medium can be arbitrarily selected from the examples provided for the negative electrode mixture.

The negative electrode and the positive electrode are stacked with a separator interposed therebetween, thereby forming an electrode assembly. The negative electrode is not subjected to pressing the negative active material layer before stacking the negative electrode and the positive electrode. It is to be noted that the positive electrode may be pressed by using a roll press or the like.

In addition, the method includes, besides the steps mentioned above, for example, a step of housing the electrode assembly in a case, and a step of injecting the nonaqueous electrolyte into the case. The injection can be performed by a known method. After the injection, the injection port is sealed, thereby allowing a nonaqueous electrolyte energy storage device to be obtained. The details of each element constituting the nonaqueous electrolyte energy storage device obtained by the above-mentioned manufacturing method are as described above.

According to the method for manufacturing the energy storage device, the negative electrode is not subjected to pressing the negative active material layer before stacking the negative electrode and the positive electrode, thereby making it possible to manufacture an energy storage device that has an enhanced suppressive effect on the expansion of the negative electrode during initial charge.

Other Embodiments

The energy storage device according to the present invention is not to be considered limited to the embodiment mentioned above.

In addition, although an embodiment of the energy storage device that is a nonaqueous electrolyte secondary battery has been mainly described in the embodiment mentioned above, other energy storage devices may be adopted. Other energy storage devices include capacitors (electric double layer capacitors, lithium ion capacitors). Examples of the nonaqueous electrolyte secondary battery include a lithium ion nonaqueous electrolyte secondary battery.

In addition, although the wound-type electrode assembly is used in the embodiment mentioned above, the energy storage device may include a stacked-type electrode assembly formed from a layered product obtained by stacking multiple sheet bodies including a positive electrode, a negative electrode, and a separator.

The present invention can be also achieved as an energy storage apparatus including the multiple energy storage devices mentioned above. In addition, one or more energy storage devices (cells) according to the present invention can be used to constitute an energy storage unit, and furthermore, the energy storage unit can be used to constitute an energy storage apparatus. In this case, the technique according to the present invention has only to be applied to at least one energy storage device included in the energy storage unit or the energy storage apparatus. The above-mentioned energy storage apparatus can be used as a power source for vehicles such as electric vehicles (EV), hybrid vehicles (HEV), and plug-in hybrid vehicles (PHEV). Furthermore, the energy storage apparatus mentioned above can be used for various power supplies such as a power supply for engine starting, an auxiliary power supply, and an uninterruptible power systems (UPS).

Figure 3:
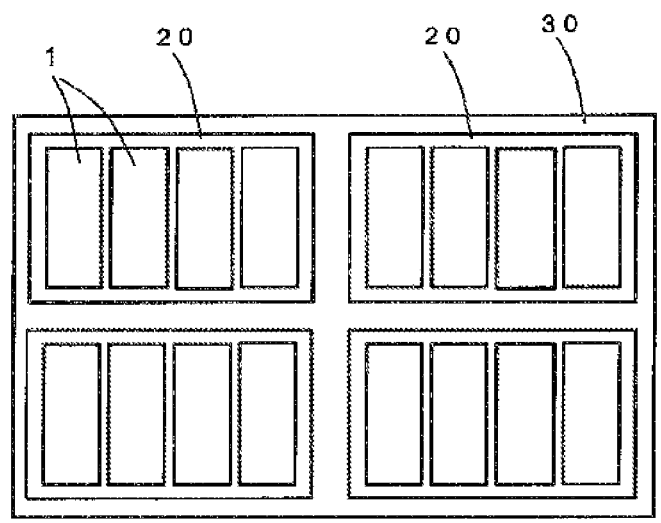
FIG. 3 is a schematic diagram illustrating an energy storage apparatus configured by assembling a plurality of energy storage devices according to an embodiment of the present invention.

FIG. 3 shows an example of an energy storage apparatus 30 obtained by further assembling energy storage units 20 each obtained by assembling two or more electrically connected energy storage devices 1. The energy storage apparatus 30 may include a bus bar (not shown) that electrically connects two or more energy storage devices 1 and a bus bar (not shown) that electrically connects two or more energy storage units 20. The energy storage unit 20 or the energy storage apparatus 30 may include a condition monitor (not shown) that monitors the condition of one or more energy storage devices.

EXAMPLES

Hereinafter, the present invention will be described more specifically with reference to examples, but the present invention is not to be considered limited to the following examples.

Preparation of Negative Electrodes According to Example 1 to Example 2 and Comparative Example 1 to Comparative Example 6

Prepared was a coating liquid (negative composite paste) containing a negative active material with the composition shown in Table 1, a styrene-butadiene rubber as a binder, and a carboxymethyl cellulose as a thickener with water as a dispersion medium. The ratios of the negative active material, the binder, and the thickener were adjusted to 97.4:2.0:0.6 in terms of ratio by mass. The coating liquid was applied to both sides of a copper foil substrate (surface roughness: 0.74 μm) with a thickness of 8 μm and dried to form a negative active material layer, thereby providing negative electrodes according to Example 1 to Example 2 and Comparative Example 1 to Comparative Example 6. Table 1 shows the physical property values of the negative active material and the presence or absence of the pressing step. Solid graphite with a value R of 0.30 was used in Examples 1 and 2. Hollow graphite with a value R of 0.21 was used in Comparative Examples 1 to 3. The coating amount of the negative composite (the negative composite paste with the dispersion medium evaporated therefrom) per unit area of one side after drying was adjusted to be 1.55 g/100 cm$^2$. Further, pressing was performed with the use of a roll press so as to reach a pressure (linear pressure) of lower than 10 kgf/mm in Example 2, and a pressure (linear pressure) of 40 kgf/mm or higher in Comparative Examples 1, 2, 4, and 6. (Calculation of Area Ratio R of Negative Active Material Particle Excluding Voids in Particle)

(1) Preparation of Measurement Sample

The powder of the negative active material particles to be subjected to measurement was fixed with a thermosetting resin. For the negative active material particles fixed with the resin, cross sections were exposed with the use of a cross-section polisher to prepare a measurement sample.

(2) Acquisition of SEM Image

For acquiring the SEM image, JSM-7001F (from JEOL Ltd.) was used as a scanning electron microscope. The condition for acquiring the SEM image is to observe the secondary electron image. The accelerating voltage was adjusted to 15 kV. The observing magnification was set such that the number of negative active material particles appearing in one field of view was 3 or more and 15 or less. The obtained SEM image was saved as an image file. In addition, conditions such as a spot diameter, a working distance, an irradiation current, a luminance, and a focus were appropriately set such that the contours of the negative active material particles were sharply defined.

(3) Clipping Contour of Negative Active Material Particle

With the use of the image clipping function of the image editing software Adobe Photoshop Elements 11, the contours of the negative active material particles were clipped from the acquired SEM image. This contour clipping was performed by selecting the outside of the contours of the active material particles with the use of the quick selection tool and editing the part excluding the negative active material particles into a black background. Then, the images of all of the negative active material particles successfully subjected to the contour clipping were subjected to binarization processing. In this regard, if the number of negative active material particles successfully subjected to the contour clipping was less than 3, the SEM image was acquired again, and the negative active material particles were subjected to the contour clipping until the number of negative active material particles successfully subjected to the contour clipping was 3 or more.

(4) Binarization Processing

For the image of the first negative active material particle among the clipped negative active material particles, the image analysis software PopImaging 6.00 was used to perform binarization processing with, as a threshold value, a set concentration that was 20% lower than the concentration for the maximum intensity. In accordance with the binarization processing, the area on the lower concentration side was calculated, thereby providing "the area S1 excluding voids in the particle".

Then, the same image of the first negative active material particle as before is subjected to binarization processing with a concentration of 10 as a threshold value. In accordance with the binarization processing, the outer edge of the negative active material particles was determined, and the area inside the outer edge was calculated, thereby providing "the area S0 of the whole particle".

With the use of the above-mentioned S1 and S0 calculated, the S1 to S0 was calculated (S1/S0) to calculate "the area ratio R1 excluding voids in the particle to the area of the whole particle" in the first negative active material particle.

The images of the second and subsequent negative active material particles among the clipped negative active material particles were each also subjected to the above-mentioned binarization processing, and the area S1 and the area S0 were calculated. Based on the calculated areas S1 and S0, the area ratios R2, R3, . . . of each negative active material particle were calculated.

(5) Determination of Area Ratio R

The average value for all of the area ratios R1, R2, R3, . . . calculated in accordance with the binarization processing was calculated, thereby determining "the area ratio R of the negative active material particles excluding voids in the particles to the area of the whole particles".

(Determination of Aspect Ratio)

(1) Preparation of Measurement Sample

Used was the above-described measurement sample with the exposed cross section, used for determining the area ratio R.

(2) Acquisition of SEM Image

For acquiring the SEM image, JSM-7001F (from JEOL Ltd.) was used as a scanning electron microscope. The condition for acquiring the SEM image was to observe the secondary electron image. The accelerating voltage was adjusted to 15 kV. The observing magnification was set such that the number of negative active material particles appearing in one field of view was 100 or more and 1000 or less. The obtained SEM image was saved as an image file. In addition, conditions such as a spot diameter, a working distance, an irradiation current, a luminance, and a focus were appropriately set such that the contours of the negative active material particles were sharply defined.

(3) Determination of Aspect Ratio

From the acquired SEM images, one hundred negative active material particles were randomly selected, and for each particle, the longest diameter A of the negative active material particle and the longest diameter B in a direction perpendicular to the diameter A were measured, and the value A/B was calculated. The aspect ratio of the negative active material particles was determined by calculating the average value for all of the calculated values A/B.

(Density of Negative Active Material Layer)

The density of the negative active material layer can be calculated by the following formula, where W represents the coating amount (g/100 cm$^2$) of the negative composite, and T represents the thickness (cm) of the negative active material layer before charge-discharge, which will be described later.

$$\text{Density of Negative Active Material Layer} (g/cm^3) = W/(T \times 100)$$

(Surface Roughness Ratio of Negative Electrode Substrate)

The surface roughness R1 of the region with the negative active material layer formed and the surface roughness R2 of the part of the negative electrode with the negative electrode substrate exposed were measured with the use of a laser microscope as described above. Thereafter, the surface roughness ratio (R2/R1) of the negative electrode substrate was calculated with the use of the measured R1 and R2. In this regard, in measuring the surface roughness R1 of the region with the negative active material layer formed, the negative active material layer was removed by ultrasonic cleaning for each of 3 minutes in water and 1 minute in ethanol with the use of a desktop ultrasonic cleaner 2510J-DTH from Branson Ultrasonics, Emerson Japan, Ltd.

Preparation of Negative Electrodes According to Example 3 to Example 6

Negative electrodes according to Example 2 to Example 6 were obtained similarly to Example 1 except for the composition of the negative active material as shown in Table 1 and Table 2. In each of Example 3 to Example 6, the same graphite (area ratio: 99.1%, aspect ratio: 2.7) as that used in Example 1 was used. In addition, Table 2 shows the presence or absence of the pressing step, the density of the negative active material layer, and the surface roughness ratio (R2/R1) of the negative electrode substrate.

Preparation of Energy Storage Devices According to Example 7 to Example 8 and Comparative Example 7 to Comparative Example 8

The negative electrode shown in Table 3, the positive electrode described later, and a polyethylene separator with a thickness of 20 μm, which were stacked, were wound, thereby preparing energy storage devices according to Example 7 to Example 8 and Comparative Example 7 to Comparative Example 8. For the positive electrode, a coating liquid (positive composite paste) containing $LiNi_{1/3}Co_{1/3}Mn_{1/3}O_2$ as a positive active material, a polyvinylidene fluoride (PVDF) as a binder, and acetylene black as a conductive agent with N-methyl-2-pyrrolidone (NMP) as a dispersion medium was prepared. The ratios of the positive active material, the binder, and the conductive agent were adjusted to 94:3:3 in terms of ratio by mass. The coating liquid was applied to both sides of an aluminum foil substrate with a thickness of 12 μm, dried, and pressed to form a positive active material layer. The coating amount of the positive composite (the positive composite paste with the dispersion medium evaporated therefrom) per unit area of one side after drying was adjusted to be 2.1 g/100 cm$^2$.

In Example 7, Comparative Example 7, and Comparative Example 8, the wound-type electrode assembly was prepared in accordance with the layout around a central winding core formed by welding a polypropylene resin sheet with a thickness of 0.3 mm, rolled in the form of a track. In Example 8, for the wound-type element, the winding start is loosened instead of disposing the hollow winding core, thereby constituting an electrode assembly with a hollow region of 0.5 mm in thickness formed in the center of the electrode assembly. In all of the energy storage devices according to Example 7 to Example 8 and Comparative Example 7 to Comparative Example 8, the outer peripheral surface of the wound-type element was brought into contact with the inner surface of the battery case with an insulating sheet interposed therebetween. As for the thickness (mm) of the hollow region in the center of the electrode assembly in each of the energy storage devices according to Example 7 to Example 8 and Comparative Example 7 to Comparative Example 8, the thickness of the hollow in the presence of a winding core substantially corresponds to the inner thickness of the winding core excluding the thickness of the resin sheet. It is to be noted that the electrode assembly was wound such that the cross section thereof was oval in shape (see FIG. 2). In addition, the thickness of the hollow region means the length of the hollow region in the thickness direction of the electrode assembly (the Y-axis direction in FIG. 2).

Table 1 shows therein the evaluation results of the negative electrodes according to Example 1 to Example 2 and Comparative Example 1 to Comparative Example 6, and Table 2 shows the evaluation results of the negative electrodes Example 1 and Example 3 to Example 6. Further, Table 3 shows the evaluation results of the energy storage devices according to Example 7 to Example 8 and Comparative Example 7 to Comparative Example 8.

[Evaluation]
(Measurement of Thickness of Negative Active Material Layer Before Charge-Discharge)

Ten samples of 2 cm×1 cm in the area of the negative electrodes before the preparation of the energy storage device were prepared as measurement samples, and the thickness of each negative electrode was measured with the use of a high-accuracy digimatic micrometer from by Mitutoyo Corporation. The thickness of the negative active material layer of one negative electrode before charge-discharge was measured by measuring the thickness of the negative electrode at 5 points for each negative electrode, and subtracting the thickness 8 µm of the copper foil substrate from the average value. The average value for the thicknesses of the negative active material layers before charge discharge, measured with the ten negative electrodes, was calculated as the thickness of the negative active material layer before charge-discharge.

(Measurement of Porosity of Negative Active Material Layer)

As described above, the "porosity" has a value on a volumetric basis, which is a calculated value calculated from the mass and true density of the constituent included in the active material layer, and the thickness of the active material layer. Specifically, the porosity is calculated by the following formula.

Porosity (%)={1−(Density of Negative Active Material Layer/True Density of Negative Active Material Layer)}×100

In this regard, "the density of the negative active material layer" (g/cm$^3$) is calculated from the coating amount W of the negative composite and the thickness T of the negative active material layer before charge-discharge as described above.

"The true density of the negative active material layer" (g/cm$^3$) is calculated from the values of the true density for each constituent contained in the negative active material layer and the mass of each constituent. Specifically, the true density is calculated by the following formula where the true density of the negative active material is denoted by D1 (g/cm$^3$), the true density of the binder is denoted by D2 (g/cm$^3$), the true density of the thickener is denoted by D3 (g/cm$^3$), the mass of the negative electrode active material included in 1 g of the negative composite is denoted by W1 (g), the mass of the binder included in 1 g of the negative composite is denoted by W2 (g), and the mass of the thickener included in 1 g of the negative composite is denoted by W3 (g).

True Density of Negative Active Material Layer (g/cm$^3$)=1/{(W1/D1)+(W2/D2)+(W3/D3)}

(Measurement of Thickness of Negative Active Material Layer in Full Charge)

The thickness of the negative active material layer in full charge was measured similarly to the measurement of the thickness of the negative active material layer before charge discharge except for disassembling the energy storage device in full charge in a glove box filled with argon with a dew point value of 60° C. or less, and measuring the negative electrode subjected to DMC cleaning as a measurement sample. It is to be noted that the phrase, in fully charge, indicates that the energy storage devices according to the examples and comparative examples before charge-discharge are subjected to constant current constant voltage charge with a current density of 2 mA/cm$^2$, a charge cutoff current density of 0.04 mA/cm$^2$, and an upper limit voltage of 4.25 V.

(Measurement of Expansion of Negative Active Material During Initial Charge)

The expansion of the negative active material during initial charge is calculated by subtracting "the thickness of the negative active material layer before charge-discharge" from "the thickness of the negative active material layer in full charge" calculated by the method described above.

(Uneven Charge-Discharge after Charge-Discharge Test)

The prepared energy storage device was subjected to a charge discharge test under the condition of an atmosphere at 60° C. with an upper limit voltage of 4.15 V and a lower limit voltage of 2.75 V, and then subjected to constant current discharge until the voltage reached 2.75 V. The negative active material layer at the inner periphery (the hollow region or part adjacent to the winding core in the electrode assembly) of the negative electrode plate removed by disassembling the energy storage device was visually confirmed to observe a whitely discolored region. The case where the discolored region was observed extending over the entire region of the negative electrode plate in the width direction thereof was rated as uneven charge-discharge observed.

| Negative electrode | Composition of negative active material (% by mass) | Physical properties of graphite particles | | Pressing step | Negative active material layer density (g/cm³) | Surface roughness ratio of negative electrode substrate R2/R1 | Evaluation | | | |
|---|---|---|---|---|---|---|---|---|---|---|
| | | Area ratio R excluding voids (%) | Aspect ratio | | | | Negative active material layer thickness before charge-discharge (μm) | Negative active material layer thickness in full charge (μm) | Expansion of negative active material layer during initial charge (μm) | Porosity of negative active material layer (%) |
| Example 1 | 100% solid graphite | 99.1 | 2.7 | No | 1,42 | 0.97 | 109 | 118 | 9 | 34.0 |
| Example 2 | 100% solid graphite | 99.1 | 2.7 | Press substantially without load | 1.49 | 0.95 | 104 | 115 | 10 | 31.0 |
| Comparative Example 1 | 100% hollow graphite | 88.8 | 1.5 | Yes | 1.57 | 0.75 | 100 | 126 | 26 | 27.0 |
| Comparative Example 2 | 100% hollow graphite | 88.8 | 1.5 | Yes | 1.42 | 0.82 | 109 | 131 | 22 | 34.0 |
| Comparative Example 3 | 100% hollow graphite | 88.8 | 1.5 | No | 0.98 | 0.97 | 159 | 172 | 13 | 54.8 |
| Comparative Example 4 | 100% solid graphite | 99.1 | 2.7 | Yes | 1.57 | 0.75 | 100 | 119 | 19 | 27.0 |
| Comparative Example 5 | 100% solid graphite | 98.1 | 8.6 | No | 0.94 | 0.97 | 165 | 178 | 13 | 56.3 |
| Comparative Example 6 | 100% solid graphite | 98.1 | 8.6 | Yes | 1,42 | 0.75 | 109 | 129 | 20 | 34.0 |

As shown in Table 1, Example 1 to Example 2 in which the negative active material layer was disposed in an unpressed shape, the density was 1.20 g/cm³ or more and 1.55 g/cm³ or less, the aspect ratio of the solid graphite particles as the negative active material was 1 or more and 5 or less, and the surface roughness ratio R2/R1 of the negative electrode substrate was 0.90 or more were excellent in suppressive effect on the expansion of the negative active material layer during initial charge.

In contrast, in Comparative Example 1, Comparative Example 2, Comparative Example 4, and Comparative Example 6 in which the negative active material layer was disposed in an unpressed shape and the surface roughness ratio R2/R1 of the negative electrode substrate was less than 0.90, the expansion of the negative active material during initial charge was increased significantly as compared with Example 1 to Example 2. Moreover, also in Comparative Example 3 and Comparative Example 5 in which the negative active material layer was disposed in a pressed state and the density of the negative active material layer was less than 1.20 g/cm³ although the surface roughness ratio R2/R1 of the negative electrode substrate was 0.90 or more, the expansion of the negative active material in the case of initial charge the negative active material layer was increased as compared with Example 1 to Example 2.

Furthermore, as for the porosity of the negative active material layer, the comparison among Example 1, Comparative Example 3, and Comparative Example 5 each with the negative active material layer disposed in an unpressed shape determines that Example 1 is low in porosity with the successfully increased packing ratio of the negative active material in spite of the layer disposed in an unpressed shape.

| Negative electrode | Composition of negative active material (% by mass) | Pressing step | Negative active material layer density (g/cm³) | Surface roughness ratio of negative electrode substrate R2/R1 | Evaluation | | | |
|---|---|---|---|---|---|---|---|---|
| | | | | | Negative active material layer thickness before charge-discharge (μm) | Negative active material layer thickness in full charge (μm) | Expansion of negative active material layer during initial charge (μm) | Negative electrode porosity (%) |
| Example 1 | 100% solid graphite particles | No | 1.42 | 0.97 | 109 | 118 | 9 | 34.0 |
| Example 3 | 90% solid graphite particles 10% Non-graphitizable carbon | No | 1.38 | 0.97 | 112 | 121 | 9 | 33.7 |
| Example 4 | 80% solid graphite particles 20% non-graphitizable carbon | No | 1.37 | 0.97 | 114 | 123 | 9 | 32.3 |
| Example 5 | 70% solid graphite particles 30% non-graphitizable carbon | No | 1.34 | 0.97 | 119 | 128 | 8 | 33.5 |
| Example 6 | 60% solid graphite particles 40% non-graphitizable carbon | No | 1.26 | 0.97 | 128 | 131 | 9 | 33.3 |

As shown in Table 2, Example 3 to Example 6 in which the negative active material includes solid graphite particles and non-graphitizable carbon has, as in Example 1 in which the negative active material includes solid graphite particles, a suppressive effect on the expansion of the negative active material layer during initial charge, and has the effect of improving the packing ratio of the negative active material because the porosity is low even with the negative active material layer disposed in an unpressed shape. Considering the suppressive effect on the expansion of the negative active material layer during initial charge and the effect of improving the packing ratio of the negative active material, the ratio by mass of the non-graphitizable carbon to the total mass of the negative active material is preferably 15 to 35% by mass, and more preferably 20 to 30% by mass.

TABLE 3

| Energy storage device | Electrode assembly | | Thickness of hollow region in center of electrode assembly (mm) | Evaluation Uneven charge-discharge after charge-discharge test |
|---|---|---|---|---|
| | Negative electrode plate | Winding core | | |
| Example 7 | Negative electrode plate in Example 1 | Hollow winding core | 0.5 | Not observed |
| Comparative Example 7 | Negative electrode plate in Comparative Example 2 | Hollow winding core | 0.5 | Observed at negative electrode near inner periphery |
| Comparative Example 8 | Negative electrode plate in Comparative Example 6 | Hollow winding core | 0.5 | Observed at negative electrode near inner periphery |
| Example 8 | Negative electrode plate in Example 1 | No | 0.5 | Not observed |

As shown in Table 3, the energy storage devices according to Example 7 to Example 8 in which the electrode assembly obtained by winding the stacked negative electrode and positive electrode with the same compositions as in Example 1 has a hollow region in the center have no uneven charge-discharge observed after the charge-discharge test, unlike the energy storage devices according to Comparative Example 7 to Comparative Example 8 according to the same embodiment including the negative electrode with the same composition as in Comparative Example 2 and Comparative Example 6. From these results, no uneven charge-discharge is presumed to have been observed because the above-mentioned energy storage devices according to Example 7 to Example 8 were relatively kept from expanding the negative electrodes, thus making the interelectrode distance between the positive electrode and the negative electrode less likely to be increased by the movement of the negative electrode plate toward the hollow as described above.

As described above, it has been demonstrated that the energy storage device has, in the case where graphite is used for the negative active material, an enhanced suppressive effect on the expansion of the negative electrode during initial charge.

INDUSTRIAL APPLICABILITY

The present invention is suitably used as energy storage devices, including nonaqueous electrolyte secondary batteries, for use as power sources for electronic devices such as personal computers and communication terminals, automobiles, and the like.

DESCRIPTION OF REFERENCE SIGNS

1: Energy storage device
2: Electrode assembly
3: Case
4: Positive electrode terminal
4': Positive electrode current collector
5: Negative electrode terminal
5': Negative electrode current collector
6: Lid
8: Center
10: Positive electrode
11: Separator
12: Negative electrode
20: Energy storage unit
30: Energy storage apparatus

The invention claimed is:

1. An energy storage device comprising an electrode assembly comprising a negative electrode and a positive electrode,
wherein
the negative electrode comprises a negative electrode substrate, and a negative active material layer containing a negative active material and disposed in an unpressed shape along at least one surface of the negative electrode substrate,
the negative active material comprises solid graphite particles as a main component,
the solid graphite particles have an aspect ratio of 1 or more and 5 or less, and
each one of the solid graphite particles has a ratio of an area excluding voids in the solid graphite particle to an area of an entirety of the solid graphite particle is 95% or more in a cross section of the solid graphite particle observed in a scanning electron microscope (SEM) image.

2. The energy storage device according to claim 1, wherein
the negative active material layer has a density of 1.20 $g/cm^3$ or more and 1.55 $g/cm^3$ or less.

3. The energy storage device according to claim 1, wherein
R2/R1 that is a ratio of surface roughness R2 of the negative electrode substrate in a region without the negative active material layer disposed to surface roughness R1 of the negative electrode substrate in a region with the negative active material layer disposed is 0.90 or more.

4. The energy storage device according to claim 1, wherein the negative active material further comprises non-graphitizable carbon.

5. The energy storage device according to claim 1, comprising an electrode assembly obtained by the negative electrode body and positive electrode body stacked, wherein the electrode assembly has a hollow region in a center of the assembly.

6. The energy storage device according to claim 1, comprising a pressure-sensitive breaking mechanism that cuts off an electrical connection between the negative electrode and the positive electrode, or a pressure-sensitive short-circuiting mechanism that electrically short-circuits the negative electrode and the positive electrode outside the electrode assembly, in a case where an internal pressure rises to a predetermined pressure.

7. The energy storage device according to claim 1, comprising:
- a case that houses the electrode assembly, with an inner surface of the case in direct or indirect contact with an outer surface of the electrode assembly; and
- a pressurizing member that pressurizes the case from outside.

8. A method for manufacturing an energy storage device, the method comprising:
- preparing a negative electrode where a negative active material layer containing a negative active material is disposed along at least one surface of a negative electrode substrate;
- preparing a positive electrode where a positive active material layer containing a positive active material is disposed along at least one surface of a positive electrode substrate; and
- stacking the negative electrode and the positive electrode, wherein the negative active material comprises solid graphite particles, the solid graphite particles have an aspect ratio of 1 or more and 5 or less, the negative electrode is not subjected to pressing the negative active material layer before stacking the negative electrode and the positive electrode, and each one of the solid graphite particles has a ratio of an area excluding voids in the solid graphite particle to an area of an entirety of the solid graphite particle is 95% or more in a cross section of the solid graphite particle observed in a scanning electron microscope (SEM) image.

9. The energy storage device according to claim 1, wherein the solid graphite particles are artificial graphite particles.

10. The method according to claim 9, wherein the solid graphite particles are artificial graphite particles.

* * * * *